United States Patent [19]

Creighton et al.

[11] Patent Number: 5,066,506

[45] Date of Patent: Nov. 19, 1991

[54] METHOD OF PREPARING STABILIZED WHOLE GRAIN FLOUR

[75] Inventors: Dean W. Creighton, Albertville; John D. Efstathiou, Plymouth; John A. Merboth, Minnetonka, all of Minn.

[73] Assignee: General Mills, Inc., Minneapolis, Minn.

[21] Appl. No.: 531,670

[22] Filed: Jun. 1, 1990

[51] Int. Cl.$^5$ .......................... A23B 4/03; A23B 4/044
[52] U.S. Cl. .................................. 426/450; 426/461; 426/462; 426/463; 426/622
[58] Field of Search ............... 426/461, 462, 463, 450, 426/622

[56] References Cited

U.S. PATENT DOCUMENTS

| | | | |
|---|---|---|---|
| 2,261,456 | 11/1941 | Warren | 426/461 |
| 2,278,473 | 4/1942 | Musher | 426/461 |
| 2,563,798 | 8/1951 | Burns et al. | 426/463 |
| 2,725,300 | 11/1955 | Cryns | 426/463 |
| 3,342,607 | 9/1967 | Hickey | 426/463 |
| 3,754,930 | 8/1973 | Toei et al. | 426/450 |
| 4,737,371 | 4/1988 | Bookwalter | 426/462 |
| 4,748,038 | 5/1988 | Lewis et al. | 426/461 |

*Primary Examiner*—Donald E. Czaja
*Assistant Examiner*—Jean L. Aberle
*Attorney, Agent, or Firm*—John A. O'Toole

[57] ABSTRACT

Disclosed are high temperature, high pressure, short residence time methods for heat treating whole cereal grains which upon milling form raw whole grain flours which exhibit enhanced storage stability. The heat treatment step involves introducing the cereal grain into a zone of high pressure and temperature. Conventional continuous cereal puffing gun apparatus are useful to practice the process. Thereafter, the whole grain is introduced to a second zone of lower pressure but wherein the pressure differential is insufficient to cause puffing. After cooling without further drying, the treated grains can be milled to form the raw whole grain flours. The whole grain flours are especially useful in the preparation of whole grain cereal products such as whole grain R-T-E corn flakes.

16 Claims, No Drawings

METHOD OF PREPARING STABILIZED WHOLE GRAIN FLOUR

FIELD OF THE INVENTION

The present invention relates to food products and their methods of preparation. More particularly, the present invention is directed towards stabilized, whole grain cereal flour and to its method of preparation.

BACKGROUND OF THE INVENTION

A wide variety of food products are prepared from cooked cereal doughs prepared from starchy cereal ingredients including corn, e.g., corn flakes R-T-E cereal. Generally, such cooked cereal dough based products are prepared from cereal doughs formed from cereal ingredient mixtures comprising de-germed, de-braned cereal flours. The selection of de-germed, de-braned cereal flours is due in large part to the stability problems associated with the utilization of whole grain cereal flours.

Whole cereal grains, i.e., individual kernels of grains, exhibit extended stability. However, upon milling to a whole grain flour the raw whole grain flour typically exhibits rapid deterioration. This rapid deterioration is due in large part to enzymatic activity, especially that which is associated with the lipid component. In part, for this reason, typical milling procedures mill the cereal grain so as to form separate streams of the bran, germ and starchy fractions since the lipid component is associated with the germ fraction. The raw starchy cereal flour fraction or white flour exhibits extended stability.

On the other hand, whole grain flours and products prepared therefrom are desirable due in part to their taste and nutritional benefits. Present consumer interest is great in products which provide the enhanced nutritional benefits and taste attributes of whole grain flours.

While all cereal grains exhibit stability problems to some degree, these problems are particularly severe in corn and oats. For corn, the problems are due in part to the high fat content of corn, e.g., 4% to 5%, relative to wheat, e.g., 2%. Oats are also high in oil content. The oil in oats is more evenly distributed than in corn where the oil is associated primarily with the germ fraction.

In order to retain the flavor and nutrition benefits of whole grain flours and to overcome the problems associated with the rapid deterioration of raw whole grain flours, the prior art includes a wide variety of techniques to provide whole grain flours, including corn flour, of increased stability. Some techniques are grain specific, e.g., the preparation of masa corn flour. In the traditional preparation of a masa flour, whole grain corn is cooked and steeped in alkaline water and milled, thereby resulting in a stabilized whole grain flour product. While useful, the alkaline water treatment imparts a characteristic flavor to the corn flour.

Another straightforward technique for preparing a cooked cereal dough from a whole cereal grain is to cook the flour to form a cooked cereal dough immediately after milling the whole grain into a flour. While useful, due to the extremely rapid rate of deterioration after milling, even a time delay after milling of a few hours can result in a product exhibiting unacceptable deterioration. In large scale commercial practice such delays are frequent and difficult to avoid entirely.

Still another long known technique described in the prior art is to form a "rebuilt" whole cereal grain by recombining the different parts of the grain after separation and individual treatments for stabilization. For example, U.S. Pat. No. 876,662 entitled "Cornmeal Product" (issued Jan. 14, 1908 to E. W. Simons) discloses a method involving separating the germ and heat treating followed by recombining the treated germ with other corn flour components.

Another technique is to mill whole cereal grains into whole cereal flours and immediately thereafter treat the whole cereal flour such as with heat to produce a stabilized whole cereal flour.

While stabilized whole grain flours are useful, it would be desirable to have a whole grain kernel which has been treated such that upon subsequent milling to form a whole cereal flour the resultant raw flour would exhibit enhanced storage stability. Such a stabilized whole kernel flour would provide the industrial user even greater convenience since whole grains are easier to handle and transport both between facilities and within facilities than flours. Fortunately, the prior art includes methods for providing such stabilized whole cereal grains. For example, U.S. Pat. No. 4,737,371 (issued Apr. 12, 1988 to G. N. Bookwalter and entitled "Process For Stabilizing Whole Cereal Grains") discloses a low temperature (95° to 110° C.), low pressure (e.g., atmospheric) long hold time (e.g., 12 minutes) process for treating whole grain kernels.

Surprisingly, still another method has been discovered for treating whole cereal grains that upon milling provide raw whole cereal grain flours of extended storage stability. In contrast to the methods disclosed in the '371 patent, the present methods involve a high temperature, high pressure, rapid heat treatment step. The principal advantage of the present invention is its simplicity. Another advantage of the present invention is the ability to use cereal processing equipment which is readily available. Still another advantage is that no pretreatment adjustment of moisture content of the grain is required or a subsequent drying step.

SUMMARY OF THE INVENTION

In one method aspect, the invention resides in high temperature, high pressure, short residence time heat treatment of whole cereal grain kernels to prepare an unpuffed stabilized whole cereal which upon milling provides a raw whole grain cereal flour exhibiting extended storage stability. The heat treatment step involves introducing the cereal grain to a zone of high pressure ranging from about 50 to 70 psig. The temperature ranges from about 350° to 600° F. The residence time is about 30 to 45 seconds. Thereafter, the treated grain is exhausted to a second zone of lower pressure and temperature, typically ambient conditions. The pressure differential is selected to avoid substantial puffing of the cereal grains. Without further drying the treated grains are cooled to room temperature.

In another method aspect, the present invention resides in methods for preparing a raw whole grain cereal flour of enhanced storage stability. The method comprises the additional step of milling the present stabilized whole cereal grain kernels to form a whole grain flour or meal.

In its product aspect, the present invention resides in treated cereal grains characterized by an intact structure, an unpuffed appearance, defined moisture content, and partial gelatinization.

The present invention finds particular suitability for use in the commercial preparation of an R.-T-E cereal of the whole corn flake type.

DETAILED DESCRIPTION OF THE INVENTION

The present invention resides in methods for treating whole grains, especially corn, which upon milling produce whole grain flours which exhibit enhanced stability. The present methods involve rapid, pressurized heating of the cereal kernels. Each of the method steps as well as end product attributes are described in detail below.

Throughout the specification and claims, percentages are by weight and temperatures are in degrees Fahrenheit unless otherwise indicated.

The method of the invention is applicable to certain common cereal grains including corn, wheat, rice, amarynth, sorghum, millet, barley, rye, and mixtures thereof. It is, of course, especially beneficial in the treatment of millet, barley, rye, amarynth and other small grains which are not readily degerminated by conventional methods, and which are most readily handled in whole and intact form. The term "intact" is used in the sense that the kernels are substantially unfractured. While particularly suitable for use in connection with cereal grains, the present invention also finds usefulness in connection with the treatment of legumes such as beans, lentils, soybeans, and peas. The process, however, has been surprisingly found not to be suitable for use in connection with oats. Oats processed by the present methods exhibit undesired extreme oat oil oxidation.

Conventionally, dried grains have a moisture content of about 14% although this concentration can vary modestly. Advantageously, the cereal grains can be treated by the present process without requiring a moisture adjustment step. However, excessively dried grains, i.e., having a moisture content below 9% are undesirable since the present treatment step can result in treated grains which upon milling result in flours exhibiting inferior storage stability. While not wishing to be bound by the proposed theory, it is speculated herein that decreasing finish moisture content facilitates undesirable oil component autooxidation.

Excessively moist cereal grains, i.e., above 16% are undesirable since the resultant treated grains can exhibit bacterial or mold growth. If necessary, the moisture content of the grains can be adjusted using conventional techniques such as forced warm air drying or tempering with water addition.

The cereal kernels are then essentially introduced into a zone of elevated temperature and pressure for a brief time but sufficiently long to inactivate those lipid enzymes responsible for rapid quality deterioration upon milling, especially lipase and lipoxygenase. The temperature desirably ranges from about 400° to 650° F. (204° to 343° C.), preferably about 450° to 625° F. (232° to 329° C.) and for best results about 500° to 600° F. (260° to 315° C.). The pressure desirably ranges from about 50 to 70 psig (345 to 483 kPa) and 55 to 65 psig (379 to 448 kPa) and for best results about 55 to 60 psig (379 to 414 kPa). Care should be taken to avoid excessive pressures such as those which upon release to atmospheric pressure would cause exposure fragmentation and the formation of a puffed cereal, e.g., 80 psig. The residence time can be very short, ranging from about 30 to 60 seconds, preferably about 30 to 45 seconds. In preferred embodiments, the kernels are subjected to a highly turbulent environment during the pressured heating step to facilitate very rapid heat transfer. The zone can be either dry or wet, e.g., using, for example, dry or wet steam as a processing media.

Highly preferred for use herein to practice the present methods are conventional continuous cereal puffing gun apparatus. Such equipment is preferred in part since the apparatus are well known and available, and can process the grain with high capacities and rapid throughputs. A variety of such gun puffing apparatus are well known and used by R-T-E cereal processors. For example, a gas heated "C-gun" or continuous puffing gun is described in U.S. Pat. No. 3,656,965, issued to Strommer et al. entitled "Process and Apparatus for Controlling the Expansion of Puffable Materials," which is incorporated herein by reference. Electrically heated guns are also used. (See, for example, U.S. Pat. No. 3,972,274, issued to Tsuchiya entitled "Apparatus for Continuously Treating Particulate Material" and U.S. Pat. No. 4,265,922, issued to Tsuchiya et al., May 5, 1981 entitled "Induction Heating Method for Processing Food Material").

Also useful herein are "S" or steam gun apparatus such as are described in U.S. Pat. No. 3,955,486 entitled "Food Processing Apparatus" (issued May 11, 1976 to P. K. Strommer), which is incorporated herein by reference.

The skilled artisan will appreciate that the present pressurized heating step is practiced at milder conditions than those typically employed when cereal gun puffing apparatus are used to prepare puffed cereals. In particular, the pressures useful in the present methods are generally substantially lower than used to prepare puffed cereals. That is, the pressure differential between the high pressure zone and the second or exhaust zone should not be so large as to cause the cereal grains to puff. Indeed, the present invention is practiced in a manner intended to avoid the preparation of a puffed cereal.

After having been introduced to the heated pressure zone, the stabilized whole cereal grains are then expelled to a second zone characterized by a lower temperature and pressure, typically ambient conditions. The treated cereal grains are then allowed to cool without further drying. The kernels experience some moisture loss upon depressurization. It is important that the method be practiced such that upon cooling the kernels have at least 8% moisture, otherwise the ground flour will be subject to auto-oxidation at the lower moisture content.

The stabilized whole grain product obtained is in the form of a relatively intact whole kernel. Although not puffed most of the grain kernels are cracked and very slightly expanded. It has been surprisingly found that substantial puffing such as to produce a puffed corn product is undesirable because not only does such puffing result in an undesirable increase in volume but also because the flour which can be prepared therefrom exhibits an undesirable increase in hexanal development.

In its whole grain form, the grain exhibits extended storage stability. Upon milling to either separate germ, bran and starch fractions, or to form a raw whole grain flour, the milled products exhibit enhanced stabilization as indicated by no peroxidase activity and lipase inactivation by the measurement of free fatty acids. The "raw" flour further exhibits some loss in birefringence although typically less than about 40%.

The stabilized grain can be used in the preparation of a wide variety of cooked cereal dough based products. It is an advantage that the raw whole grain flour prepared by milling the present grains exhibit extended storage stability so as to provide operational flexibility in commercial operations which form cooked cereal doughs, e.g., the commercial preparation of R-T-E cereals.

While useful in the form of treated whole cereal grains, in another embodiment of the present invention, the present grain treatment methods comprise the additional step of milling the heat treated whole cereal grains to form a raw or semi-raw whole cereal grain flour. Conventional milling apparatus and techniques can be used to practice the present milling step.

EXAMPLE 1

A stabilized whole grain corn flour of the present invention was prepared according to the following procedure. A quantity of yellow dent whole kernel corn was divided into portions. The moisture content of the corn was 12%. One portion was subjected to a heat treatment in an E-type continuous cereal puffing gun. The processing conditions were as follows:

| Feed rate | 20 lbs/min |
| --- | --- |
| Gun angle | 3.0° elevation |
| Barrel temperature | 500° F. |
| Steam temperature | 500° F. |
| Barrel rotation | 60 RPM |
| Steam pressure | 60 psig |
| Residence time | 30–45 sec |

After exiting the cereal gun to the atmosphere and cooling to ambient temperature, the treated corn was characterized by the properties of cracked, but was not puffed. A second portion was similarly treated but at a gun pressure of 80 psig and barrel rotation of 50 rpm which upon exiting the gun formed undesirable puffed corn pieces.

Thereafter, portions of treated and untreated corn were similarly (milled to form whole grain raw corn meal/flours) handled. The treated grains/raw flours were than packaged in aluminum foil pouches and subjected to accelerated aging and intermittently tested for stability. The samples were assayed for fat acidity development (AACC method reported in Laboratory Methods, 7th ed. American Association of Cereal Chemists (1962) methods 02-01A and 02-02A except that toluene is replaced with acetone and KOH is replaced with NaOH). The results of the testing are reported in Table 1 below and graphically depicted in FIG. 1).

| Time at 45° C. | Fat Acidity (%) | | |
| --- | --- | --- | --- |
| (days) | Raw | Low Puff | High Puff |
| 0 | 0.16 | 0.17 | 0.24 |
| 2 | 0.39 | 0.13 | 0.15 |
| 4 | 0.47 | 0.13 | 0.15 |
| 7 | 0.56 | 0.11 | 0.18 |
| 14 | 0.71 | 0.18 | 0.17 |
| 28 | 1.00 | 0.13 | — |

From the above analytical results it is evident that the use of the present high temperature short residence time method is a satisfactory method of inactivating the rancidity enzymes in whole corn, increasing the storage stability of whole corn flour.

Useful stabilized whole grain products of the present invention are also obtained when the corn is substituted with equivalent amounts of wheat, rice, barley or rye grain kernels.

EXAMPLE 2

The stability of raw whole cereal flours prepared from treated whole grain cereal grains was compared to untreated raw whole cereal grain flours.

Raw and treated whole corn from a test run performed substantially as described above, was ground in a Fitz mill, then stored at 45° C. and at room temperature (approx. 21° C.). In this experiment, only corn treated at 55 psi was tested. Again, raw corn flour increased dramatically in fat acidity percent (Table 2). The presently treated corn flour showed no increase.

Peroxidase enzyme activity tests were also performed on presently treated corn. A trace or no activity was found in the various samples that were tested. Conversely, very high levels of peroxidase activities were evident in raw corn flour (300–1400 Iu/g).

TABLE 2

| Time | Raw Flour | | E-Gun Treated Flour | |
| --- | --- | --- | --- | --- |
| (days) | 21° C. | 45° C. | 21° C. | 45° C. |
| 0 | 0.15 | 0.15 | 0.15 | 0.15 |
| 3 | — | 0.33 | — | 0.14 |
| 7 | 0.23 | 0.41 | 0.14 | 0.14 |
| 14 | — | 0.61 | — | 0.14 |
| 21 | 0.35 | 0.61 | 0.15 | 0.14 |
| 28 | — | 0.73 | — | 0.14 |
| 35 | 0.50 | 0.76 | 0.15 | 0.18 |

EXAMPLE 3

A quantity of whole corn was processed as in Example 1, except that the gun angle was 3.5. The corn was milled through a Fitz mill, using a 1/32" screen. Raw whole corn was ground similarly. One week after grinding each of the flours, both flours were used to produce R-T-E whole corn flakes. Finished flakes were put into glass jars, stored at 55° C., and intermittently tested for stability by measuring hexanal development by gas chromatography. Results are shown in Table 3. Hexanal value is the ratio of hexanal developed to a constant level of standard.

TABLE 3

| | Hexanal value | |
| --- | --- | --- |
| Time (days) | Raw flour flake | Treated flour flake |
| 0 | 0.06 | 0.03 |
| 7 | 0.06 | 0.06 |
| 14 | 1.19 | 0.34 |
| 25 | 1.71 | 0.87 |
| 32 | 4.28 | 0.90 |

The above data indicates that the present heat treated whole corn flour resulted in increased stability of finished product. Additionally, the flake using the present heat processed flour was more acceptable in flavor, having a more well-rounded, roasted corn flavor.

What is claimed is:

1. A method for treating a whole cereal grain that upon milling provides a raw whole cereal grain of enhanced storage stability, consisting essentially of the steps of:

A. introducing an untempered, intact raw whole cereal grain having a starchy content, selected from the group consisting of corn, wheat, rice, amarynth, sorghum, millet, barley, rye, and mixture thereof into a zone of elevated temperature and pressure, said cereal grain having a moisture content of 9% to 14%, said zone having a temperature ranging from about 500° to 600° F. (260° to 315° C.) and a pressure of about 50 to 70 psig (345 to 483 kPa gauge) for a residence time of about 30 to 60 seconds to form a superheated whole cereal grain having a portion of its starch component gelatinized;

B. conveying the superheated whole cereal grain to a second zone of lower temperature and pressure to form treated substantially unpuffed whole cereal grains having a moisture content of at least 8% and wherein the starchy content is partially gelatinized and has a loss in birefringence of less than 40%; and, C. cooling the treated unpuffed whole cereal grain to ambient conditions to form an unpuffed stabilized whole cereal grain.

2. The method of claim 1 wherein the whole cereal grain is selected from the group consisting of corn, wheat, rice, barley, rye, and mixtures thereof.

3. The method of claim 2 wherein the pressure in the zone of higher pressure ranges from about 55 to 65 psig (379 to 448 kPa gauge).

4. The method of claim 3 wherein the pressure in the first zone ranges from about 55 to 60 psig (379 to 414 kPa gauge).

5. The method of claim 4 wherein the residence time ranges from about 30 to 45 seconds.

6. The method of claim 5 wherein step A is practiced by introducing the whole cereal into a rotating continuous cereal puffing gun.

7. The method of claim 5 wherein the second zone is at atmospheric pressure and ambient temperature and wherein the treated grain is cracked.

8. The method of claim 6, additionally comprising the step of:

D. without further drying, milling the treated whole cereal grain to form a raw whole cereal grain flour.

9. The method of claim 8 wherein the cereal is corn.

10. A method for treating whole legumes that upon milling provides raw whole legumes of enhanced storage stability, consisting essentially of the steps of:

A. introducing an untempered, intact whole raw legume having a starchy content into a zone of elevated temperature and pressure, said legumes having a moisture content of at least 9%, said zone having a temperature ranging from about 500° to 600° F. (260° to 315° C.) and a pressure of about 50 to 70 psig (345 to 483 kPa gauge) for a residence time of about 30 to 60 seconds to form a superheated whole legume having a portion of its starch component gelatinized;

B. conveying the superheated whole legume to a second zone of lower temperature and pressure to form substantially unpuffed whole legumes having a moisture content of at least 8% and having a loss in birefringence of less than 40%;

C. cooling the unpuffed dried whole legume to ambient conditions to form an unpuffed stabilized whole legume.

11. The method of claim 10 wherein the legume is selected from the group consisting of beans, lentils, soybeans, peas, and mixtures thereof.

12. The method of claim 11 wherein the pressure in the zone of higher pressure ranges from about 55 to 65 psig.

13. The method of claim 12 wherein the pressure in the first zone ranges from about 55 to 60 psig.

14. The method of claim 13 wherein the second zone is at atmospheric pressure and ambient temperature.

15. The method of claim 14 wherein step A is practiced by introducing the legume into a continuous rotating cereal puffing gun.

16. The method of claim 15, additionally comprising the step of:

D. without further drying, milling the legume to form a raw flour.

* * * * *